United States Patent [19]

Tamai et al.

[11] 4,164,604
[45] Aug. 14, 1979

[54] LEADER OR TRAILER TAPE FOR A MAGNETIC RECORDING MEDIUM

[75] Inventors: Yasuo Tamai; Masaaki Fujiyama; Hiroshi Amari, all of Odawara, Japan

[73] Assignee: Fuji Photo Film Co., Ltd., Kanagawa, Japan

[21] Appl. No.: 831,498

[22] Filed: Sep. 8, 1977

[30] Foreign Application Priority Data

Sep. 13, 1976 [JP] Japan .................... 51-108895

[51] Int. Cl.² .................... B32B 27/36; B32B 23/12; B32B 31/28
[52] U.S. Cl. .................... 428/409; 428/480; 428/500; 428/539; 428/900
[58] Field of Search .................... 428/409, 539, 500, 480, 428/900

[56] References Cited

U.S. PATENT DOCUMENTS

| | | | |
|---|---|---|---|
| 2,654,681 | 10/1953 | Lueck | 428/900 X |
| 3,142,582 | 7/1964 | Koretzky | 418/409 |
| 3,198,653 | 8/1965 | Hall | 428/539 X |
| 3,324,280 | 6/1967 | Cheney et al. | 428/409 X |
| 3,561,995 | 2/1971 | Wu et al. | 428/409 |
| 3,827,699 | 8/1974 | Waugh | 274/47 |

FOREIGN PATENT DOCUMENTS 861710 2/1961 United Kingdom.

Primary Examiner—Harold Ansher
Attorney, Agent, or Firm—Armstrong, Nikaido, Marmelstein & Kubovcik

[57] ABSTRACT

The present invention relates to a leader or trailer tape for a magnetic recording medium, which comprises a non-magnetic flexible support having a surface roughness of at least 0.15 μm, at least one side thereof being optionally subjected to a surface activating treatment, and a transparent and electrically conductive metal oxide layer provided thereon.

16 Claims, 1 Drawing Figure

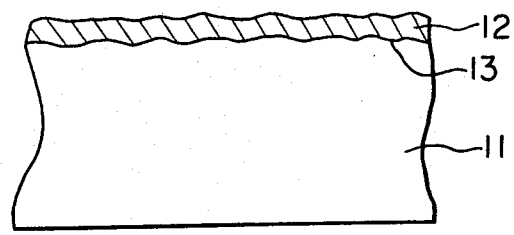

LEADER OR TRAILER TAPE FOR A MAGNETIC RECORDING MEDIUM

BACKGROUND OF THE INVENTION

1. Field of the Invention

The present invention relates to a leader or trailer tape attached to the end of a magnetic recording medium and more particularly, it is concerned with a leader or trailer tape for a magnetic recording medium, which is improved in abrasion resistance as well as light permeability.

2. Description of the Prior Art

It is known to detect optically the end of a magnetic tape in a video tape recorder. That is to say, the end of a magnetic tape is detected when a transparent leader tape attached to the end of a magnetic tape is crossed between a light source and light detecting means such as photodiode. As a leader tape for this purpose, there have hitherto been used non-treated bases such as polyethylene terephthalate, cellulose acetate and polyvinyl chloride films, which are not subjected to a special treatment. However, these materials are excellent in light permeability, but have the disadvantage that the electric resistance is high so that the static electricity generated is hardly removed and dusts tend to adhere through electrostatic attraction. The dusts adhered to a leader tape are removed to the surface of a magnetic layer or a magnetic head before long, resulting in drop outs or output lowering. Thus it has been proposed to provide a leader or trailer tape with a layer containing an antistatic agent or pigment, as disclosed in Japanese Patent Application (OPI) Nos. 38007/1972, 40504/1974 and 57408/1975.

SUMMARY OF THE INVENTION

It is an object of the invention to provide a leader tape or trailer tape for a magnetic recording medium, whereby the above described disadvantages are overcome.

It is another object of the invention to provide a leader or trailer tape for a magnetic recording medium, which has an improved abrasion resistance and light permeability.

These objects can be attained by a leader or trailer tape for a magnetic recording medium, which comprises a non-magnetic flexible support having a surface roughness of at least 0.15 μm, at least one side thereof being subjected to a surface activating treatment, and a transparent and electrically conductive metal oxide layer provided thereon.

BRIEF DESCRIPTION OF THE DRAWING

The FIGURE of the accompanying drawing is to illustrate one embodiment of the leader or trailer tape, in cross section, according to the present invention.

DETAILED DESCRIPTION OF THE INVENTION

It has been found as a result of our studies on the above described prior art methods that the use of antistatic agents in a large amount results in increase of the electric conductivity itself (in particular, remarkable at a high humidity), but tends to cause adhesion and antistatic agents have the disadvantage that they are largely affected by the ambient conditions, in particular, humidity. Furthermore, it is found that, when a white pigment is added in such an amount as to be effective for lowering the static charging property, the scattering of light of the leader tape is increased and the permeability of light is decreased. It is further found that non-treated base or a base having an antistatic layer has not a sufficient abrasion resistance. In the case of a magnetic tape for a small type video, the leader tape portion is provided on a magnetic drum at the time of loading or end detecting during recording or reproducing and under this state, a rotating magnetic head is continuously rotated. Therefore, the surface of the leader tape in contact therewith is scraped resulting in head clogging, unless it has a sufficient abrasion resistance.

The inventors have made various efforts to provide a leader or trailer tape free from the above described disadvantages and consequently have found that this object can be accomplished by subjecting a film of high molecular material to a surface activating treatment and providing a transparent and electrically conductive metal oxide layer on the activated surface. That is to say, in accordance with the present invention, there is provided a leader or trailer tape for a magnetic recording medium, which comprises a non-magnetic flexible support having a surface roughness of 0.15 μm or more, at least one side thereof being subjected to a surface activating treatment, and a transparent and electrically conductive metal oxide layer provided thereon.

The structure of the leader or trailer tape according to the present invention is shown in the accompanying drawing, in which 11 is a non-magnetic, light-permeable and flexible support, 12 is a metal oxide layer and 13 is the surface of the support, being subjected to a surface activating treatment.

The concept or construction of the present invention will now be illustrated in detail. When using a metal oxide layer as an antistatic layer, its function can sufficiently be displayed even with a small thickness to keep the light permeability only. Particularly, it is found that, when an oxide layer of one or more metals selected from the group consisting of indium, gallium, thallium, tin, titanium, vanadium, chromium, molybdenum, tungsten and alloys of these metals is formed by the vapor deposition method, the leader or trailer tape is excellent in light permeability, antistatic property and durability. More particularly, indium oxide and indium oxide-tin oxide are preferable from the standpoint of deterioration of the antistatic property with the passage of time. In the latter case, the composition of indium oxide and tin oxide comprises preferably 95 to 80% by weight of indium oxide and 5 to 20% by weight of tin oxide.

As the support of high molecular material used in the present invention, ordinary thermoplastic resins and thermosetting resins are effective. In general, supports of high molecular materials have a surface resistivity of $10^{15}\Omega$ or more, but the surface resistivity can readily be lowered to $10^{11}\Omega$ or less by the provision of a metal oxide layer according to the present invention. Accordingly, selection of high molecular material for the support is not particularly limited. The support can include pigments, whitening agents, antistatic agents, plasticizers, etc. The high molecular materials include oligomers and initial condensates in addition to those called "high molecular materials" in the field of the ordinary polymer chemistry. Useful examples of the high molecular material in view of the transparency, flexibility and other dynamic properties are cellulose derivatives such as cellulose acetate and the like; styrene type polymers such as polystyrene, styrenebutadiene copolymers, poly-α-methylstyrene and the like; polyesters such as polyhexamethylene terephthalate, polyethylene terephthalate, polyethylene naphthalate and the like; polyolefins such as polyethylene, polypropylene and the like; and polycarbonates. The thickness of the support is not particularly limited, but is preferably 5 to 200 μm.

The inventors have found that the surface roughness of such a support has a great influence upon the durability when used as a leader tape. That is to say, it is found that if the surface is too smooth, the coefficient of friction is increased and thus a metal oxide tends to be scraped. The surface roughness, measured by means of a Stylus-type roughness tester, is generally 0.15 μm or more, preferably 0.25 μm or more in view of the durability. On the other hand, it is found that if the surface roughness is too large, for example, 1.8 μm or more, the light permeability is lowered. The allowable optical density depends upon a magnetic recording and reproducing apparatus to be used, but it is generally 0.4 or less.

The surface activation treatment of a support of high molecular material according to the present invention is generally carried out by the use of glow discharge, electron ray, flame, corona discharge, etc. As a method for the surface treatment to increase the adhesiveness between a support of high molecular material and a vapor deposition film, on the other hand, there are proposed a method comprising irradiating the surface of a high molecular support with electron ray (G. M. Sessler et al: "J. App. Poly. Sci" 17, page 3199–3209 (1973)) and a method comprising exposing a support of high molecular material to an atmosphere of plasma discharge (Japanese Patent Application (OPI) No. 65271/1973). Moreover, it is well known that a glass surface is cleaned by ionic bombardment in a glow discharge to increase the adhesiveness to a vapor deposition film ("Usumaku Kogaku (Thin Film Engineering) Handbook" I-178 (Ohm Co., 1964), G. Maissel et al: "Handbook of Thin Film Technology" 6-41 (McGraw Hill Co., 1970)).

The surface activation treatment of a high molecular material in the present invention serves to not only clean the surface thereof but also dehydrate the adsorbed water therefrom. When a transparent and electrically conductive film is formed on a support of a relatively hydrophilic and high water content high molecular material such as cellulose triacetate and polyimide, a desirable thin film cannot be obtained unless the adsorbed water is dehydrated from the surface.

It is known that the properties of a vapor deposition film are varied to a great extent with temperature and adsorbed water. For example, it is known that the resistance of a thin film is increased by adsorption of steam (J. M. Seehof et al: "J. Chem. Phys." 23, 2459 (1955)). In the prior art, it is carried out to heat a high molecular material as a method of dehydrating adsorbed water on a surface. As such a surface layer dehydrating method, furthermore, there are used glow discharge, electron ray irradiation, flame treatment, etc., but glow discharge and electrodeless discharge are most suitable in view of the efficiency and simplicity of processing. Oxygen, nitrogen, air or argon is preferably used as an ambient gas for the discharge treatment.

Provision of a metal oxide layer, in particular, indium oxide layer on a surface-activated high molecular material can be carried out by various methods, for example, comprising subjecting metals or metal oxides to vapor deposition in vacuum and comprising depositing metals on supports by high frequency sputtering or chemical coating and, if necessary, oxidizing the deposit.

In a case where the metal oxide layer consists of a mixture of metal oxides or a composite metal oxides, the corresponding metals are vapor deposited in the form of their alloys or individually in a suitable order.

In a method for forming a lower oxide coating of a metal, in particular, indium on a support member of high molecular material, a vacuum vessel is once evacuated to a degree of vacuum of $2 \times 10^{-5}$ Torr, into which oxygen gas is then admitted to a degree of vacuum of $1 \times 10^{-4}$ to $1 \times 10^{-3}$ Torr, and under this state, metallic indium is evaporated. During the same time, the metallic indium evaporated is reacted with oxygen gas and deposited on a support of high molecular material as a lower oxide of indium.

In general, heating oxidation is taken into consideration as a method for the forced oxidation of a lower oxide, but there are few high molecular supports capable of resisting deformation even upon heating at 150° C. or higher. Therefore, it is difficult to form a transparent and electrically conductive film of indium oxide on various high molecular supports without deteriorating their planar property.

The inventors have made studies as to methods for the forced oxidation except heating oxidation, for example, as to anodic oxidation, liquid phase oxidation, discharge oxidation and the like and consequently have found that the discharge oxidation method is effective. Between the cases where such a film is subjected to discharge oxidation and not to discharge oxidation, there is no great difference in surface resistivity, but the transparency of the film is markedly increased by the discharge oxidation treatment. For example, using a surface activated polyethylene terephthalate film of 100 microns in thickness as a support, indium is vapor deposited thereon with a thickness of 120 Å in a vacuum vessel substituted by oxygen and kept at a vacuum degree of $3 \times 10^{-3}$ Torr. The optical density is 0.32 at this time, i.e., before oxidation, but can be lowered to 0.02 by subjecting to glow oxidation in an oxygen atmosphere with a degree of vacuum of $2 \times 10^{-2}$ Torr. That is, the transparency can markedly be raised. On the other hand, the surface resistivity is $4 \times 10^4 \Omega$/square before the oxidation treatment and $2 \times 10^4 \Omega$/square after the oxidation treatment. The latter is somewhat smaller than the former. This is possibly due to the continuity of the vapor deposited layer. These values are very satisfactory from the antistatic effect.

As a method for the forced oxidation by discharge, it is preferable to use glow discharge or electrodeless discharge in view of the efficiency of oxidation and the simplicity of processing.

The oxidation time required for lowering the optical density of a vapor deposition film by the same quantity, that is, for making transparent depends largely upon the degree of vacuum. In an oxidation treatment by glow discharge using electrodes, the treatment is most effectively carried out for a shortest time at a vacuum degree of $1 \times 10^{-2}$ Torr to $6 \times 10^{-2}$ Torr, while in an oxidation treatment by electrodeless discharge, the treatment is most effectively carried out for a shortest time at a vacuum degree of 1 Torr to 5 Torr.

That is to say, it is particularly important from the combination of effects that formation of a transparent and electrically conductive film of indium oxide according to the present invention is carried out by vapor depositing indium at a degree of vacuum of $1 \times 10^{-4}$ to $1 \times 10^{-2}$ Torr under oxygen substitution and then subjecting to a glow discharge treatment in an oxygen atmosphere as described above.

The thickness of the vapor deposition film should be determined considering the antistatic property and transparency of a leader tape. In general, the film thickness is 10 to 400 Å, preferably 20 to 300 Å, since if the film thickness in the vapor deposition is less than 20 Å, the indium oxide layer is transparent but the surface resistivity is too large, i.e., $10^{11} \Omega$ or more, while if more than 300 Å, the surface resistivity of the layer is sufficiently small, i.e., about $10^2 \Omega$, but the optical density is so large that the transparency be extremely worse and the time required for increasing the transparency by glow discharge be extremely longer.

Furthermore, it is found that a method for forming an indium oxide film wherein metallic indium is evaporated in an atmosphere with a vacuum degree of $1 \times 10^{-2}$ Torr to $1 \times 10^{-4}$ Torr substituted by oxygen to form a lower oxide of indium on a support of high molecular material, the flow rate of oxygen into a vacuum vessel is then increased and the lower oxide is subjected to forced oxidation by glow discharge at a degree of vacuum of $1 \times 10^{-2}$ to $6 \times 10^{-2}$ or by electrodeless discharge at 1 to 5 Torr, is most effective in the above described thickness range of the vapor deposition film in view of that a uniform indium oxide film can be obtained with a high production efficiency without deteriorating or deforming the shape or planar property of a high molecular support.

Production of the leader or trailer tape according to the present invention can be completed by effecting, in order, the above described surface treatment, vapor deposition and forced oxidation separately, but a desirable tape can be produced continuously and rapidly by the use of a vacuum tank divided into three chambers, one chamber for vapor deposition ($1 \times 10^{-2}$–$1 \times 10^{-4}$ Torr) and other two chambers for surface treatment and forced oxidation by glow discharge ($1 \times 10^{-2}$–$6 \times 10^{-2}$ Torr or 1–5 Torr).

For the production of the leader or trailer tape according to the present invention, the above described vapor deposition layer can be provided on one or both surfaces of a support. If necessary, a back layer can previously be provided on the back surface of a support of high molecular material.

The adhesion of a metal oxide, in particular, indium oxide layer to a support of high molecular material is very excellent.

EXAMPLE 1

One surface of each of four kinds of polyethylene terephthalate film supports having a thickness of 36 μm but differing in surface roughness (i.e., 0.08 μm, 0.37 μm, 0.60 μm, 1.40 μm) was subjected to a surface treatment by glow discharge with a discharge output of 600 W for 4 seconds in an oxygen atmosphere having a degree of vacuum of $2 \times 10^{-2}$ Torr. Subsequently, the degree of vacuum was further reduced to $5 \times 10^{-5}$ Torr. Thereafter, oxygen was introduced into the vacuum vessel to keep a degree of vacuum of $2 \times 10^{-3}$ Torr and indium was vapor deposited to give a thickness of 45 Å from a vapor deposition source kept at 1050° C. in a boat of boron nitride. The thickness of the vapor deposition film was measured by means of a film thickness meter by the quartz vibrator method. The resulting vapor deposition film was then subjected to forced oxidation by glow discharge with a discharge output of 600 W for a treatment time of 8 seconds in the same vacuum vessel keeping an atmosphere at a degree of vacuum of $2 \times 10^{-2}$ Torr substituted by oxygen, thus forming a thin film of indium oxide. The samples obtained in this way are hereafter called Sample Nos. 1 (Comparative Example 1), 2, 3 and 4. The surface resistivity of these samples was not lowered even if the relative humidity was changed over 60% to 15% at a temperature of 25° C.

COMPARATIVE EXAMPLE 2

Using a polyethylene terephthalate film with a surface roughness of 0.37 μm and a thickness of 36 μm, procedure of Example was repeated except that the surface treatment of Example was not carried out, thus forming a thin film of indium oxide. The thus obtained sample is hereafter called Sample No. 5.

Each of the samples prepared by the above described methods was cut in a width of ½ inch to give a leader tape and subjected to measurement of the optical density, electric resistance and abrasion resistance, thus obtaining results as shown in Table.

Table

| Properties | Sample Nos. | | | | |
|---|---|---|---|---|---|
| | 1 | 2 | 3 | 4 | 5 |
| Optical Density (permeated) | 0.02 | 0.03 | 0.05 | 0.12 | 0.02 |
| Electric resistance (Ω/square) | $3.6 \times 10^4$ | $4.0 \times 10^4$ | $1.9 \times 10^5$ | $8.8 \times 10^5$ | $3.5 \times 10^4$ |
| Abrasion Resistance (still life) | 4 sec. | 20 sec. | 35 sec. | 1 min. | 1 sec. |

"Still life" in this table means a time while the indium oxide layer is scraped and the support is scraped and then marked when the tape is kept stationary as a rotating head of EIAJ Type I VTR is driven. The head marking the support encounters clogging by the scraped support.

It is apparent from Table that the leader tape Sample Nos. 2 to 4 are more excellent in electric resistance and durability than those of the prior art and favourably compared therewith in light permeability.

EXAMPLE 2

One surface of a polyethylene terephthalate film support having a thickness of 36 μm and a surface roughness of 1.40 μm was subjected to a surface treatment by glow discharge with a discharge output of 600 W for 4 seconds in an oxygen atmosphere having a degree of vacuum of $2 \times 10^{-2}$ Torr. Subsequently, the degree of vacuum was further reduced to $5 \times 10^{-5}$ Torr. Thereafter, oxygen was introduced into the vacuum vessel to keep a degree of vacuum of $2 \times 10^{-3}$ Torr and indium was vapor deposited to give a thickness of 60 Å from a vapor deposition source kept at 1050° C. in a boat of boron nitride. Then, the degree of vacuum in the vacuum vessel was adjusted to $5 \times 10^{-5}$ Torr and tin was vapor deposited on the resultant indium film to give a thickness of 10 Å from a vapor deposition source kept at 1350° C. in a boat of tungsten. The thickness of the vapor deposition film was measured by means of a film thickness meter by the quartz vibrator method. The resulting vapor deposition film was then subjected to forced oxidation by glow discharge with a discharge output of 600 W for a treatment time of 8 seconds in the same vacuum vessel keeping an atmosphere at a degree of vacuum of $2 \times 10^{-2}$ Torr substituted by oxygen, thus forming a thin film of indium oxide-tin oxide. The thus obtained sample had a composition consisting of 85.7% by weight of indium oxide and 14.3% by weight of tin oxide, a surface resistivity of $1.0 \times 10^6 \Omega$/square, being substantially constant at a temperature of 25° C. and a relative humidity ranging from 15% RH to 60% RH, an optical density of 0.14 and an abrasion resistance of 1 minute.

EXAMPLE 3

One surface of a polyethylene terephthalate film support having a thickness of 36 μm and a surface roughness of 1.40 μm was subjected to a surface treatment by glow discharge with a discharge output of 600 W for 4 seconds in an oxygen atmosphere having a degree of vacuum of $2 \times 10^{-2}$ Torr. Subsequently, the degree of vacuum was further reduced to $5 \times 10^{-5}$ Torr. Thereafter, oxygen was introduced into the vacuum vessel to keep a degree of vacuum of $2 \times 10^{-3}$ Torr and titanium was vapor deposited to give a thickness of 100 A from a vapor deposition source kept at 1750° C. in a boat of tungsten. The thickness of the vapor deposition film was measured by means of a film thickness meter by the quartz vibrator method. The resulting vapor deposition film was then subjected to forced oxidation by glow discharge with a discharge output of 600 W for a treatment time of 8 seconds in the same vacuum vessel keeping an atmosphere at a degree of vacuum of $2 \times 10^{-2}$ Torr substituted by oxygen, thus forming a thin film of titanium oxide. The thus obtained sample had a surface resistivity of $3.5 \times 10^4 \Omega$/square being substantially constant at a temperature of 25° C. and a relative humidity of ranging from 15% RH to 60% RH, an optical density of 0.15 and an abrasion resistance of 30 seconds.

What is claimed is:

1. A leader or trailer tape for a magnetic recording medium comprising a transparent non-magnetic flexible support film of a material from the group consisting of a polymeric cellulose esters, polystyrene, polyesters, polyolefins, polyvinyl resins, and polycarbonates, said film having a surface roughness of 0.15-1.8 μm, and having deposited thereon by vapor deposition in vacuum or high frequency spattering a transparent electrically conductive coating of 10-400 Å thickness of an oxide of a metal from the group consisting of indium, gallium, thallium, tin, titanium, vanadium, chromium, molybdenum, tungsten and alloys thereof.

2. The leader or trailer tape for a magnetic recording medium as claimed in claim 1, wherein the polyester is polyethylene terephthalate.

3. The leader or trailer tape for a magnetic recording medium as claimed in claim 1, wherein the cellulose derivative is cellulose acetate.

4. The leader or trailer tape for a magnetic recording medium as claimed in claim 1, wherein the non-magnetic flexible support has a thickness of 5 to 200 μm.

5. The leader and trailer tape for a magnetic recording medium as claimed in claim 1, wherein at least one side of the non-magnetic flexible support is subjected to a surface activating treatment to increase the adhesion of the metal oxide layer thereto, the surface activating treatment being a glow discharge, electron ray, flame or corona discharge treatment.

6. The leader or trailer tape for a magnetic recording medium as claimed in claim 4, wherein the discharge is carried out in an atmosphere of a gas selected from the group consisting of oxygen, nitrogen, air and argon.

7. The leader or trailer tape for a magnetic recording medium as claimed in claim 1, wherein the both sides of the support have vapor deposition layers.

8. The leader or trailer tape for a magnetic recording medium as claimed in claim 1, wherein the back side of the support has a back layer previously provided.

9. The leader or trailer tape for a magnetic recording medium as claimed in claim 1, wherein the transparent and electrically conductive metal oxide layer consists of indium oxide.

10. The leader or trailer tape for a magnetic recording medium as claimed in claim 1, wherein the transparent and electrically conductive metal oxide layer consists of indium oxide-tin oxide.

11. The leader or trailer tape for a magnetic recording medium as claimed in claim 9, wherein the indium oxide-tin oxide layer consists of 95 to 80% by weight of indium oxide and 5 to 20% by weight of tin oxide.

12. The leader or trailer tape for a magnetic recording medium as claimed in claim 1, wherein the indium oxide layer is formed by evacuating a vacuum vessel to a degree of vacuum of up to $2 \times 10^{-5}$ Torr, introducing oxygen thereinto to adjust the degree of vacuum to $1 \times 10^{-4}$ to $1 \times 10^{-2}$ Torr, evaporating metallic indium in this state to form a lower oxide of indium and then subjecting the lower oxide of indium to a forced oxidation.

13. The leader or trailer tape for a magnetic recording medium as claimed in claim 12, wherein the forced oxidation is carried out by heating oxidation, anodic oxidation, liquid phase oxidation or discharge oxidation.

14. The leader or trailer tape for a magnetic recording medium as claimed in claim 13, wherein the discharge oxidation is carried out by glow discharge or electrodeless discharge.

15. The leader or trailer tape for a magnetic recording medium as claimed in claim 14, wherein the glow discharge is carried out in a degree of vacuum of $1 \times 10^{-2}$ to $6 \times 10^{-2}$ Torr.

16. The leader or trailer tape for a magnetic recording medium as claimed in claim 14, wherein the electrodeless discharge is carried out in a degree of vacuum of 1 to 5 Torr.

* * * * *